United States Patent [19]

Grips et al.

[11] Patent Number: 5,019,223

[45] Date of Patent: May 28, 1991

[54] BLACK CHROMIUM PLATING BATH USEFUL FOR SOLAR REFLECTING COATINGS

[75] Inventors: Vatia K. W. Grips; Indira Rajagopal; Sundarapandium Rajagopalan, all of Bangalore, India

[73] Assignee: The Council of Scientific & Industrial Research, New Delhi, India

[21] Appl. No.: 554,106

[22] Filed: Jul. 18, 1990

Related U.S. Application Data

[63] Continuation-in-part of Ser. No. 259,272, Oct. 18, 1988, abandoned.

[30] Foreign Application Priority Data

Jan. 5, 1988 [EP] European Pat. Off. ........ 8830004801

[51] Int. Cl.$^5$ .............................................. C25D 3/04
[52] U.S. Cl. ...................................................... 204/51
[58] Field of Search .......................................... 204/51

[56] References Cited

U.S. PATENT DOCUMENTS

| | | | |
|---|---|---|---|
| 3,419,481 | 12/1968 | Nelson | 204/51 |
| 3,511,759 | 5/1970 | Nelson | 204/51 |
| 3,620,935 | 11/1971 | Willson | 204/51 |
| 3,720,588 | 3/1973 | Oleson et al. | 203/51 |
| 3,723,261 | 3/1973 | Byers et al. | 204/51 |
| 3,909,404 | 9/1975 | Boycott | 204/51 |
| 4,174,265 | 11/1979 | Minegishi et al. | 204/51 |

FOREIGN PATENT DOCUMENTS 1449446 9/1976 United Kingdom .

OTHER PUBLICATIONS

Nguyen, "Industrial Black Chromium Electroplating," Chemical Abstracts 94 (22), No. 182528z (1980).

*Primary Examiner*—John F. Niebling
*Assistant Examiner*—Steven P. Marquis
*Attorney, Agent, or Firm*—Pennie & Edmonds

[57] ABSTRACT

The composition disclosed is an improved black chromium plating bath useful for solar selective coatings. The bath comprises an aqueous solution of sulphate-free chromic acid containing ions of nitrate, borate and fluosilicate. Being a room temperature black chromium bath, good quality black chromium deposite is obtained in the temperature range of 30° C. to 50° C. which is quite coherent and whose selectivity is better than 8.

23 Claims, No Drawings

BLACK CHROMIUM PLATING BATH USEFUL FOR SOLAR REFLECTING COATINGS

This is a continuation-in-part of application Ser. No. 07/259,272, filed 10-18-88 now abandoned.

This invention relates to the formulation of a bath for black chromium plating, which is used to produce solar selective coatings of die-cast steel or zinc, instruments and camera parts and consumer goods like spectacle frames, knobs, watches, pens, various parts of a radio, tape recorder, television etc.

Black chromuim is deposited by electrolysing an aqueous solution of sulphate-free chromic acid, containing certain additives known as 'catalysts' at low temperature and at very high current density. These additives and their effects are described below.

Acetate or acetic acid has been used as, catalyst. The deposit from this bath is generally powdery and grey at room temperature. Only at a temperature below 20° C. does the deposit tend to become black. The black color can be improved by adding boric acid. For obtaining black chrome deposits from acetate based baths, the current density has to be greater than 0.5 Amp/Cm$^2$ 500 Asf). Deposits from these baths, however, have low U.V. stability.

Fluorides have also been used as catalysts, but they provide non-uniform grey coatings. Complex fluorides like cryolite, silicofluoride and fluoborates have been used to improve the uniformity. The addition of nitrates and ferric compounds are made to these baths to improve the throwing power. Baths based on fluorides also suffer from the disadvantage of requiring operation at temperatures less than 20° C. and at current densities in the range of 400 to 2000 Asf.

Nitrates have been used as a catalyst for producing black chromium deposits at current densities greater than 500 Asf. Mixtures of nitrates and boric acid have been used as a catalyst. Here again, a current density of 1000 Asf (1 Amp/Cm$^2$) is needed.

Catalysts like sulphamic acid, potassium ferro cyanide and ammonium borate have also been reported. These baths have to be operated at low-temperatures and at current densities greater than 0.5. A/Cm$^2$ (500 Asf).

The main deficiencies in the black chromium baths which have been described above are:

i. the plating has to be carried out at temperatures below 20° C.;
ii. the current density needed for plating is very high (greater than 500 Asf); and
iii. the deposit tends to be powdery with a lower absorptivity.

Since current density is very high, there will be a lot of heating due to the passage of current. This increases the load on the cooling systems used to reduce the temperature of the bath.

Selective black coatings are used on surfaces of devices which are meant to collect solar energy for its utilisation. Such black coatings are characterised by very high absorptivity in the UV and visible regions and very poor absorption in the near IR and IR region. A black chromium coating is one of the proven selective coatings for the collection of solar energy. This bath is useful for plating black chromium useful for collecting solar energy.

In addition, anti-reflection finishes are required on certain parts of automobiles, optical components, photographic equipment, instruments and on a variety of consumer goods for aesthetic appeal. Black chromium is ideally suited for these applications because of its good corrosion and abrasion resistance.

The bath described in this invention is useful for black chromium plating of solar collectors, automobile parts and the like.

Thus, there is a need for a black chromium bath which can be operated at room temperature i.e. without refrigeration and at normal current densities.

The object of the present invention is to provide an improved plating bath useful for the solar selective coatings which can be operated at a relatively high temperature and a reasonably low current density: i.e., at room temperature and at normal current densities.

Another object of the invention is to provide a black chromium bath which improves the absorptivity and emissivity as well as the coherence of the deposit.

The main finding of the present invention is that the use of a catalyst mixture consisting of ions of nitrate, borate and fluosilicate in combination with an aqueous solution of sulphate free chromic acid provides black chromium deposits at room temperature and at normal current density.

Accordingly, the present invention provides an improved black chromium plating bath useful for solar selective coatings which comprises an aqueous solution of sulphate free chromic acid containing ions of nitrate, borate and fluosilicate. Since the bath of the invention does not contain any organic additives, such as oxalic acid ($C_2H_2O_4$) disclosed for example, in British Patent No. 1,449,446, it is therefore free of carbon. The presence of such organic additives typically leads to the formation of carbonaceous impurities in the black chromium deposit, which diminishes the ability of such a coating to collect solar energy.

According to a feature of the invention, the ions of nitrate may be selected from alkali metal nitrates and nitric acid.

According to another feature of the invention, the ion of borates is selected from alkali metal borate, boric acid and borax.

According to still another feature of the invention, the ions of fluosilicate are selected from fluosilicic acid and fluorsilicate.

According to yet another embodiment of the invention the proportion of the ingredients of the bath may range as follows:

(a) Ions of nitrate: 2-20 gpl
(b) Ions of borate: 3-40 gpl
(c) Ion of fluosilicate: 0.5-5 gpl
(d) the remaining being chromic acid.

The chromic acid component of the bath is an aqueous solution of sulphate-free chromic acid in a concentration of about 60 to 500 and preferably 200 to 400 grams per liter. These concentrations are conventional and well known to those skilled in the art from, for example, U.S. Pat. Nos. 3,419,481 and 3,511,759. The 500 grams/liter concentration represents a saturated solution of chromic acid.

The composition is not a mere admixture. The property of the bath is not the sum total of the properties of the components. Electrolysis of sulphate-free chromic acid produces only hydrogen at the cathode. Neither bright chromium nor black chromium deposits on the cathode. To obtain black chromium deposits of adequate selectivity and proper ratio of absorptivity to emissivity, a bath containing any one of the three catalysts or combinations of any two of them will have to be operated at low temperatures, i.e., below 20° C., and at current densities above 40 A/dm² (400 A/sq.ft.). Baths conventionally used at room temperature have to be operated at current densities greater than 100 A/dm² (1000 A/sq.ft.) and generally yield a brownish deposit which often tends to be powdery. When all the three substances are mixed and used as a 'mixed catalyst', a black chromium deposit having a high selectivity i.e., a high ratio of absorptivity to emissivity, is obtained at room temperature (30°–40° C.) with low current densities (10–30 A/dm² or 100–300 A/sq.ft.). The deposit is also coherent and adherent. These results show that the three catalysts when present together in the bath act synergistically to bring about the deposition of black chromium coating having high selectivity at room temperature and at low current density.

The bath is not very sensitive to composition changes. The throwing power of the bath is comparable to that of a conventional chromium plating bath. The bath can work with a trivalent chromium concentration as low as 1 gpl and can tolerate up to 16 gpl. The bath has an almost infinite shelf life and can be rejuvenated.

The invention is illustrated by the following Examples which, however, are not to be construed to limit the scope of the invention:

EXAMPLE 1

Black chromium deposits was plated from the bath, the composition of which is given below:
1. Alkali metal nitrate: 2–20 gpl
2. Boric acid: 3–40 gpl
3. Fluosilicate: 0.5–5 gpl
the remaining being an aqueous solution of sulfate free chromic acid.

The processing sequence is as follows: cathodic cleaning, rinse, acid dip, rinse, nickel plate from a nickel sulphamate bath, rinse, black chromium plate with the above solution at 80 Asf to 300 Asf. The duration of plating is 40 secs to 5 mins. Similar experiments are performed using nitric acid, alkali metal borate or borax and fluosilicic acid. The absorptivity ($\alpha$) and emissivity ($\epsilon$) of the black chromium deposits plated at different temperatures and current densities are given in Table 1.

EXAMPLE 2

To one liter of a 250 gms/l aqueous solution of chromic acid, 20 gms of barium carbonate were added. The mixture was then filtered with the filtrate being a sulphate free chromic acid solution. To this solution 5 gms of sodium nitrate, 10 gms of boric acid and 0.5 ml of fluosilicic acid were added. The resultant mixture constitutes a black chromium bath in which the additives sodium nitrate, boric acid and fluosilicic acid constitute the catalyst. A bath prepared as set forth above was analyzed and found to contain 0.2 gms/l of trivalent chromium.

In this bath, electroplating was conducted for 1 minute at 30° C. employing a copper panel as a cathode and a lead sheet as the anode. The current density was 0.25 A/cm². The panel was found to be coated uniformly with black chromium. This deposit was found to show an absorptivity ($\alpha$) of 0.97 and an emissivity (E) of 0.12.

This example demonstrates that a mixture of nitrate, boric acid and fluosilicic acid acts as a catalyst in producing a black chromium deposit suitable for solar energy applications. In addition, it further demonstrates that black chromium may be plated at room temperature. It also shows that the bath can work without the addition of extra trivalent chromium.

EXAMPLE 3

To a black chromium bath prepared as in Example 2, 120 ml of a 30% $H_2O_2$ solution were added. The mixture was stirred and allowed to stand for 1 hour. This solution was found by analysis to contain 16 gms/l of trivalent chromium. A copper panel was electroplated employing the same conditions as in Example 2. The deposit exhibited an $\alpha$ value of 0.97 and an E value of 0.12.

This example demonstrates that the bath can tolerate trivalent chromium in a concentration as high as 16 gms/l.

EXAMPLE 4

A bath was prepared in the manner disclosed in Example 2 and maintained in a thermostate. By suitably setting the thermostat, the bath was maintained at temperatures of 35°, 40° and 50° C. At each temperature a copper panel was plated for 60 seconds at a current density of 0.25 A/cm². The plated panels exhibited the following values of $\alpha$ and E.

| Temperature (°C.) | Absorptivity | Emissivity |
|---|---|---|
| 35 | 0.96 | 0.20 |
| 40 | 0.96 | 0.14 |
| 50 | 0.97 | 0.24 |

This example demonstrates that selectivity is not significantly lost by operating the bath at higher temperatures (i.e., up to 50° C.).

EXAMPLE 5

To one liter of a 250 gms/l chromic acid solution, 20 gms of barium carbonate were added and the mixture was then filtered. 2 gms of sodium nitrate, 3 gms of boric acid and 0.5 ml of fluosilicic acid were added to the filtrate. A copper panel was employed as the cathode and a lead sheet as the anode in electroplating for 1.5 minutes at a current density of 0.25 cm². The copper panel was coated with a uniform black color. The absortivity value of the coating was 0.90 while the emissivity value was 0.20. The ratio of these two values, i.e., the solar selectivity, was 4.5. This Example demonstrates the lower effective concentration levels of the catalyst.

EXAMPLE 6

To one liter of a 250 gms/l aqueous solution of chromic acid, 20 gms of barium carbonate were added and the mixture was filtered. 20 gms of sodium nitrate, 40 gms of boric acid and 3.5 ml of fluosilicic acid were added to the filtrate. A copper panel was electroplated as in Example 5 and was found to be coated uniformly with black chromium. This Example demonstrates the upper effective limits of the additive concentration.

EXAMPLE 7

To one liter of a 450 gms/l aqueous solution of chromic acid, 20 gms of $BaCO_3$ were added and the mixture was filtered. 5 gms of sodium nitrate, 10 gms of boric acid and 0.5 ml of fluosilicic acid were added to the filtrate. A copper panel was then electroplated as in Example 2. The panel was found to be coated with a uniform black chromium deposit. This example demonstrates that black chromium may be deposited from solutions containing a relatively high concentration of chromic acid.

EXAMPLE 8

To one liter of a 100 gms/l aqueous chromic acid solution, 20 gms $BaCO_3$ were added and the mixture was filtered. 10 gms of sodium nitrate, 15 gms of boric acid and 0.3 ml of fluosilicic acid were added to the filtrate. A copper panel was then electroplated as in Example 2 and uniformly coated with black chromium. This Example demonstrates that black chromium may be coated from a bath containing a relatively low concentration of chromic acid.

TABLE 1

Absorptivity and Emissivity of black chromiun deposits obtained from the new bath

| Temp. °C. | Current density A/Cm² | Absorptivity α | Emissivity ε |
|---|---|---|---|
| 22 | 0.29 | 0.97 | 0.10 |
| 30 | 0.29 | 0.97 | 0.12 |
| 35 | 0.29 | 0.97 | 0.14 |
| 40 | 0.29 | 0.96 | 0.20 |
| 50 | 0.29 | 0.97 | 0.24 |
| 30 | 0.15 | 0.95 | 0.12 |

The solar selectivity of a chromium deposit, i.e., the efficiency with which it traps solar energy, is determined by the ratio between the absortivity ($\alpha$) and the emissivity (E) of the coating as discussed above. The useful range of $\alpha$ values for such coatings is between about 0.9 and 1.0 whereas emissivity values of less than 0.25 are acceptable. The preferred range of absortivity is 0.95-1.0 while the preferred emissivity range is 0.1 to 0.15. Coatings are considered to have an excellent selectivity if the ratio of $\alpha$:E>9. Ratios in the range of 6-8 are considered good, while 4-6 is fair, whereas ratios of less than 4 are considered poor in terms of selectivity.

With regard to the present invention, applicants have obtained an improved selectivity for chromium deposits obtained with their baths when the concentration range of the fluosilicate component in the bath is between about 0.5 and 4 gms/l. At concentrations below 0.5 gms/l of this material, the emissivity of the black chromium layer is too high (i.e. 0.3 to 0.4), while at above 4 gms/l of the fluosilicate, the absorbance drops to about 0.80. Thus, coatings formed in baths having less than about 0.5 gms/l or more than about 4 gms/l of the fluosilicate component are fit only for decorative use since they are not solar selective. The improved black chromium plating bath of the present invention has the following advantages:

(a) It is a room temperature black chromium bath. Good quality black chromium deposits are obtained in the temperature range 30° to 50° C.

(b) The operating current density is low. Good quality black chromium deposits are obtained with a current density in the range 0.08 to 0.3 A/cm² (80 to 300 Asf).

(c) The deposits are quite coherent and is not powdery.

(d) The selectivity i.e., the ratio of absorptivity to emissivity, is greater than 8 and the absorptivity is greater than 0.95.

What is claimed is:

1. A black chromium plating bath which comprises 2-20 grams per liter of nitrate ions, 3-40 grams per liter of borate ions, 0.5-5 grams per liter of fluosilicate ions and the balance being an aqueous, solution of sulphate-free chromic acid, wherein said bath is substantially free of oxalic acid which forms carbonaceous impurities in said black chromium.

2. The bath of claim 1 wherein the nitrate ions are obtained from an alkali metal nitrate or nitric acid.

3. The bath of claim 1 wherein the borate ions are obtained from an alkali metal borate, boric acid or borax.

4. The bath of claim 1 wherein the fluosilicate ions are obtained from fluosilic acid or a fluosilicate.

5. A process for the electrolytic deposition of a black chromium coating useful as a solar coating which comprises formulating the bath of claim 1, and effecting electrolysis of the bath at a temperature of about 30° to 50° C. at a current density of about 80 to 300 amps per square foot to deposit a black chromium coating upon a substrate.

6. The bath of claim 1 wherein the black chromium has an absorptivity of at least about 0.9.

7. The bath of claim 6 wherein the absorptivity value is between about 0.9 and 1.0.

8. The bath of claim 7 wherein the absorptivity value is between about 0.95 and 1.0.

9. The bath of claim 1 wherein the black chromium has an emissivity of less than about 0.25.

10. The bath of claim 9 wherein the emissivity is between about 0.1 and 0.15.

11. The bath of claim 1 wherein the black chromium has a solar selectivity value of at least about 4.

12. The bath of claim 11 wherein the solar selectivity is between about 8 and 9.5.

13. A black chromium plating bath which consists essentially of 2-20 grams per liter of nitrate ions, 3-40 grams per liter of borate ions, 0.5-5 grams per liter of fluosilicate ions and the balance being an aqueous solution of chromic acid.

14. A process for the electrolytic deposition of a black chromium coating useful as a solar coating which comprises formulating the bath of claim 13, and effecting electrolysis of the bath at a temperature of about 30° to 50° C. at a current density of about 80 to 300 amps per square foot to deposit a black chromium coating upon a substrate.

15. The bath of claim 13 wherein said bath is substantially free of oxalic acid which forms carbonaceous impurities in said black chromium.

16. A black chromium plating bath which consists of 2-20 grams per liter of nitrate ions, 3-40 grams per liter of borate ions, 0.5-5 grams per liter of fluosilicate ions and the balance being an aqueous solution of sulphate free chromic acid.

17. A process for the electrolytic deposition of a black chromium coating useful as a solar coating which comprises formulating the bath of claim 16, and effecting electrolysis of the bath at a temperature of about 30° to 50° C. at a current density of about 80 to 300 amps per square foot to deposit a black chromium coating upon a substrate.

18. The bath of claim 16 wherein said bath is substantially free of oxalic acid which forms carbonaceous impurities in said black chromium.

19. The bath of claim 16 having a trivalent chromium concentration of less than about 16 gms/l.

20. A black chromium plating bath consisting essentially of an aqueous solution of sulphate-free chromic acid and a sufficient amount of at least one catalyst compound to permit the formation of a black chromium coating having a solar selectivity value of at least about 4.

21. The bath of claim 20 wherein said solar selectivity value is between about 8 and 9.5.

22. The bath of claim 20 wherein said at least one catalyst compound comprises from about 2-20 grams per liter of nitrate ions, 3-40 grams per liter of borate ions and 0.5-5 grams per liter of fluosilicate ions.

23. A process for the electrolytic deposition of a black chromium coating useful as a solar coating which comprises formulating the bath of claim 26 and effecting electrolysis of the bath at a temperature of about 30° to 50° C. at a current density of about 80 to 300 amps per square foot to deposit a black chromium coating upon a substrate.

* * * * *